United States Patent
Song et al.

(10) Patent No.: US 11,397,236 B2
(45) Date of Patent: Jul. 26, 2022

(54) METHOD OF LOCATING COAL-ROCK MAIN FRACTURE BY ELECTROMAGNETIC RADIATION FROM PRECURSOR OF COAL-ROCK DYNAMIC DISASTER

(71) Applicants: University of Science and Technology Beijing, Beijing (CN); Zhong-an Academy of safety Engineering, Beijing (CN)

(72) Inventors: Dazhao Song, Beijing (CN); Xueqiu He, Beijing (CN); Zhenlei Li, Beijing (CN); Menghan Wei, Beijing (CN); Quan Lou, Beijing (CN); Anhu Wang, Beijing (CN)

(73) Assignees: UNIVERSITY OF SCIENCE AND TECHNOLOGY BEIJING, Beijing (CN); ZHONG-AN ACADEMY OF SAFETY ENGINEERING, Beijing (CN)

( * ) Notice: Subject to any disclaimer, the term of this patent is extended or adjusted under 35 U.S.C. 154(b) by 678 days.

(21) Appl. No.: 16/348,508

(22) PCT Filed: Mar. 30, 2018

(86) PCT No.: PCT/CN2018/081211
§ 371 (c)(1),
(2) Date: May 9, 2019

(87) PCT Pub. No.: WO2019/085384
PCT Pub. Date: May 9, 2019

(65) Prior Publication Data
US 2019/0277942 A1    Sep. 12, 2019

(30) Foreign Application Priority Data
Oct. 31, 2017   (CN) .......................... 201711052286.8

(51) Int. Cl.
*G01S 5/04*        (2006.01)
*G01V 3/12*        (2006.01)
(Continued)

(52) U.S. Cl.
CPC ................... *G01S 5/04* (2013.01); *G01V 3/08* (2013.01); *G01V 3/082* (2013.01); *G01V 3/12* (2013.01); *G01V 3/38* (2013.01)

(58) Field of Classification Search
CPC ............ G01S 5/04; G01V 1/008; G01V 3/00; G01V 3/08; G01V 3/12; G01V 3/082; G01V 3/30; G01V 3/38
(Continued)

(56) References Cited

U.S. PATENT DOCUMENTS 3,594,633 A * 7/1971 Barringer ................. G01V 3/12
                                                                  324/330
3,662,260 A * 5/1972 Thomas .................. G01R 29/24
                                                                  343/873
4,884,030 A * 11/1989 Naville ................... G01V 1/008
                                                                  324/345

(Continued)

FOREIGN PATENT DOCUMENTS

CN          103197356 A         7/2013
CN          103995296 A         8/2014
(Continued)

*Primary Examiner* — Gregory C. Issing
(74) *Attorney, Agent, or Firm* — Bayramoglu Law Offices LLC

(57) ABSTRACT

A method of locating a coal-rock main fracture by an electromagnetic radiation from a precursor of a coal-rock dynamic disaster is provided. At least four groups of three-component electromagnetic sensors are arranged in the underground tunnels, and each group of sensors includes three directive antennas for receiving electromagnetic signals orthogonal to each other. The electromagnetic signals are collected by a monitoring host. The signals are ensured (Continued)

to be received by different sensors synchronously via an atomic clock. The direction of the magnetic field line is determined by performing a vector superposition on strengths of the three-component electromagnetic signals of each group of sensors. The planes of electromagnetic wave propagation perpendicular to the direction of the magnetic field line are determined accordingly. The location of the coal-rock fracture is determined by the intersection point of the planes of electromagnetic wave propagation determined by the multiple groups of sensors.

8 Claims, 2 Drawing Sheets

(51) Int. Cl.
*G01V 3/08* (2006.01)
*G01V 3/38* (2006.01)
(58) Field of Classification Search
USPC .................................................. 342/459
See application file for complete search history.

(56) References Cited

U.S. PATENT DOCUMENTS

| | | | | |
|---|---|---|---|---|
| 4,904,943 | A * | 2/1990 | Takahashi | G01V 3/12 324/323 |
| 5,694,129 | A * | 12/1997 | Fujinawa | G01V 1/008 340/690 |
| 6,191,587 | B1 * | 2/2001 | Fox | G01V 3/082 324/350 |
| 6,873,265 | B2 * | 3/2005 | Bleier | G01V 1/008 342/76 |
| 6,985,817 | B2 * | 1/2006 | Saenz Alvarado | G01V 1/008 702/15 |

FOREIGN PATENT DOCUMENTS

| | | | |
|---|---|---|---|
| CN | 104090306 | A | 10/2014 |
| CN | 105807256 | A * | 7/2016 |
| CN | 105807256 | A | 7/2016 |
| CN | 106970424 | A | 7/2017 |
| CN | 107843874 | A | 3/2018 |
| WO | 2012169937 | A2 | 12/2012 |

* cited by examiner

METHOD OF LOCATING COAL-ROCK MAIN FRACTURE BY ELECTROMAGNETIC RADIATION FROM PRECURSOR OF COAL-ROCK DYNAMIC DISASTER

CROSS REFERENCE TO THE RELATED APPLICATIONS

This application is the national phase entry of International Application No. PCT/CN2018/081211, filed on Mar. 30, 2018, which is based upon and claims priority to Chinese Patent Application No. 201711052286.8, filed on Oct. 31, 2017, the entire contents of which are incorporated herein by reference.

TECHNICAL FIELD

The present invention relates to a method of locating a coal-rock main fracture by an electromagnetic radiation from a precursor of a coal-rock dynamic disaster, belonging to the technical field of the coal-rock main fracture locating method.

BACKGROUND

Coal mining conditions are complex in China, and the coal-rock dynamic disaster is one of the major disasters that happens in coal mines. With the increase of mining depth, the frequency, intensity and degree of damage of coal-rock dynamic disasters present a rising trend. Meanwhile, the number of occurrences and casualties are relatively increasing. The monitoring and forewarning of coal-rock dynamic disasters mainly includes a static index method and a geophysical method. The static index method can only obtain limited information and has a low accuracy, while the geophysical method can achieve a real-time, dynamic and continuous monitoring.

Electromagnetic radiation generated by rock deformation and fracture is a common physical phenomenon. As a very promising geophysical method, a research of the electromagnetic radiation method has made considerable achievements in the aspects of the generation mechanism and signal characteristics of the electromagnetic radiation generated by coal-rock damage, and the application status, influencing factors, signal monitoring and data processing system of predicting coal-rock dynamic disasters in recent years. Based on electromagnetic radiation monitoring technology, the locating of the coal-rock main fracture of the precursor of the coal-rock dynamic disasters is realized, having great significance for an accurate monitoring and forewarning of the coal-rock dynamic disasters and preventing coal-rock dynamic disasters. In addition, this method is also applicable to the prevention and control of rock burst disasters in non-coal mines, and can effectively improve the safety situation of mine production.

In view of the above problems, the present invention provides a method for locating a coal-rock main fracture by an electromagnetic radiation from a precursor of a coal-rock dynamic disaster, which is suitable for preventing and controlling rock burst disasters in non-coal mines, and capable of effectively improving the safety situation of mine production.

SUMMARY

In order to achieve the above-mentioned objective, the technical solution of the present invention is as follows. A method of locating a coal-rock main fracture by an electromagnetic radiation from a precursor of a coal-rock dynamic disaster includes the following steps:

step 1, collecting three-component electromagnetic signals generated from downhole coal-rock fractures, by using at least four groups of non-coplanar three-component electromagnetic sensors arranged in the underground tunnels, and ensuring that the non-coplanar three-component electromagnetic sensors in different groups receive the signal synchronously via an atomic clock;

step 2, analyzing frequency spectrums of the electromagnetic signals collected by each group of non-coplanar three-component electromagnetic sensors, and recognizing and ensuring the electromagnetic signals, received by different sensors, are from a same main fracture by a signal frequency criterion;

step 3, performing a vector superposition on strength of the three-component electromagnetic signals received by each group of sensors to determine a direction of a magnetic field line at a position where each group sensor is located;

step 4, determining a plane of electromagnetic wave propagation according to the direction of the magnetic field line at the position, wherein the electromagnetic wave is perpendicular to the direction of the magnetic field line; and step 5, determining an intersection point of various planes of electromagnetic wave propagation as a location of an electromagnetic radiation source, wherein the various planes of electromagnetic wave propagation are determined by the multiple groups of three-component electromagnetic sensors, and the location of the electromagnetic radiation source is an area of the coal-rock main fracture of a precursor of the coal-rock dynamic disaster.

Further, in the step 1, the non-coplanar three-component electromagnetic sensors are provided with receiving antennas, the receiving antennas are wide-frequency directive antennas with a receiving frequency of 1 Hz-10 kHz, and each two of the three antennas in each group sensor are in an orthogonal arrangement in a form of three-dimensional Cartesian coordinate system.

Further, in the step 3, a method of the vector superposition includes:

① defining strengths of three components as $H_x$, $H_y$, $H_z$, respectively;

② according to a principle of vectorial resultant, calculating a total strength $H=\sqrt{H_x^2+H_y^2+H_z^2}$;

③ calculating azimuth angles $\alpha$, $\beta$, $\gamma$ based on $H_x=H\cos\alpha$, $H_y=H\cos\beta$ and $H_z=H\cos\gamma$, wherein $\alpha$, $\beta$, $\gamma$ are azimuth angles between a signal and three antennas, respectively; and ④ determining a direction of a magnetic field line according to the azimuth angles and directions of the three antennas, wherein $\vec{h}=\cos\alpha, \cos\beta, \cos\gamma$ represents a cosine of the direction of the magnetic field line.

Further, in the step 4, the plane of electromagnetic wave propagation is determined by a formula of a direction cosine orthogonal to the direction of the magnetic field line obtained according to $\vec{h}=(\cos\alpha, \cos\beta, \cos\gamma)$ and $\vec{h}\cdot\vec{r}=0$.

Further, in the step 5, a number of the multiple groups of three-component electromagnetic sensors are more than 4.

Compared with the prior art, the present invention has the following advantages.

The present invention provides a method of locating a coal-rock main fracture by an electromagnetic radiation from a precursor of a coal-rock dynamic disaster. At least four groups of three-component electromagnetic sensors are arranged in the underground tunnels. Each group of three-component electromagnetic sensors includes three directive antennas for receiving electromagnetic signals orthogonal to each other, and collects the electromagnetic signals by a monitoring host. In the present invention, the signals are ensured to be synchronously received by different sensors via an atomic clock. Moreover, the electromagnetic signals received by different antennas which are ensured to be from the same fracture are selected by using electromagnetic signal frequency as the characteristic parameter. Furthermore, the direction of the magnetic field line at the position where each group of sensors is located is determined by performing a vector superposition on strengths of the three-component electromagnetic signals of each group of sensors. The planes of electromagnetic wave propagation perpendicular to the direction of the magnetic field line are determined according to the direction of the magnetic field line. The location of the coal-rock fracture is determined by the intersection point of the planes of electromagnetic wave propagation determined by the multiple groups of sensors. The present invention is suitable for the prevention and control of rock burst disasters in non-coal mines, and can effectively improve the safety situation of mine production.

DETAILED DESCRIPTION

The technical solutions in the embodiments of the present invention will be described definitely and completely with reference to the accompanying drawings in the embodiments of the present invention. It will be apparent that the embodiments described herein are a mere part of the embodiments of the present invention, rather than all embodiments. Based on the embodiments of the present invention, all other embodiments made by those skilled in the art without creative work belong to the protective scope of the present invention.

Figure 1:
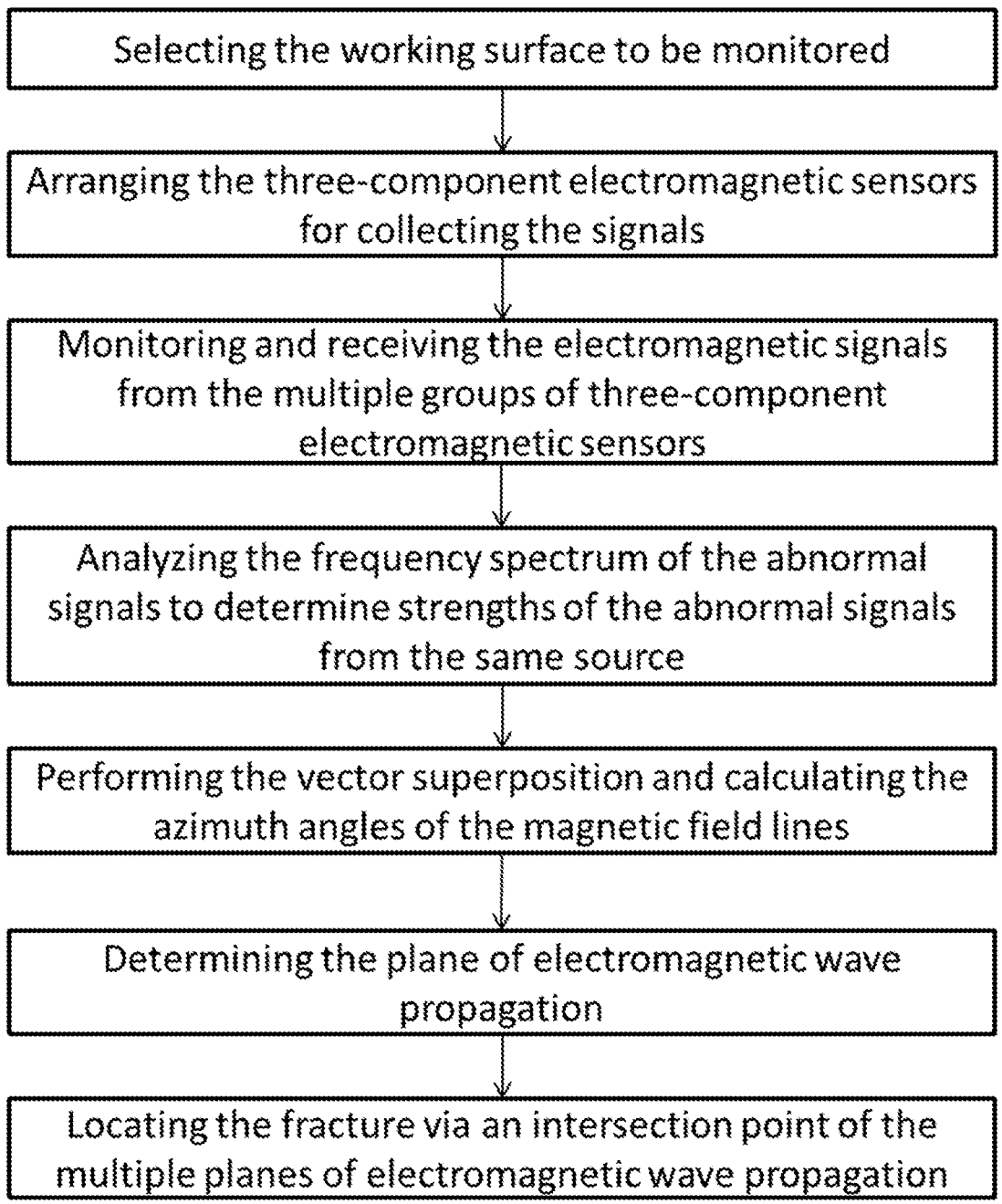
FIG. 1 is a flow chart of the present invention.
Figure 2:
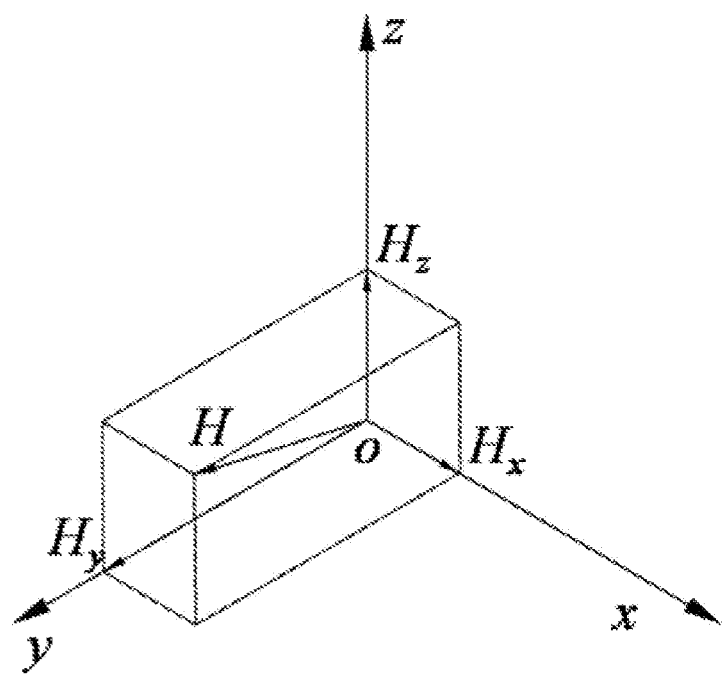
FIG. 2 is a schematic diagram of a vectorial resultant of the present invention.

Now referring to FIG. 1-FIG. 2, a technical solution of the present invention is as follows. A method of locating a coal-rock main fracture by an electromagnetic radiation from a precursor of a coal-rock dynamic disaster includes the following steps:

step 1, a working surface to be monitored is selected, two groups of three-component electromagnetic sensors are arranged on each of a working surface track roadway and a belt conveyance roadway, a distance between the two groups of sensors in the working surface track roadway or the belt conveyance roadway is 100 m; three-component electromagnetic signals are collected by a monitoring host in real time, and the three-component electromagnetic signals are ensured to be received by sensors in different groups synchronously via an atomic clock;

step 2, frequency spectrums of abnormal signals are analyzed, and the electromagnetic signals received by antennas of different three-component electromagnetic sensors are ensured to be from a same main fracture;

step 3, a vector superposition is performed on strengths of the three-component electromagnetic signals received by different electromagnetic sensors to determine a direction of a magnetic field line at a position where each group of sensors is located;

step 4, a plane of electromagnetic wave propagation is determined according to the direction of the magnetic field line at the position; and step 5, a location of an electromagnetic radiation source is determined by an intersection point of the planes of electromagnetic wave propagation.

In the present embodiment, in the step 1, the non-coplanar three-component electromagnetic sensors are provided with receiving antennas, the antennas for receiving the electromagnetic radiation are wide-frequency directive antennas, and the antennas are in an orthogonal arrangement in a form of three-dimensional Cartesian coordinate system.

In the step 2, a receiving frequency of each antenna is 1 Hz-10 kHz.

In the step 3, a method of the vector superposition includes:
  i. strengths of signals received by the three antennas are defined as $H_x$, $H_y$, $H_z$, respectively;
  ii. the three signals are equivalent to three components on directions of X axis, Y axis and Z axis; and a vectorial resultant is performed on the three components to obtain a resultant signal having a strength $H=\sqrt{H_x^2+H_y^2+H_z^2}$; and
  iii. an azimuth angle of the resultant signal meets the following: $H_x=H \cos \alpha$, $H_y=H \cos \beta$ and $H_z=H \cos \gamma$, and a cosine of a vector direction is $\vec{h}=(\cos \alpha, \cos \beta, \cos \gamma)$.

In the step 4, a method of determining a direction of the plane of electromagnetic wave propagation is as follows:
a formula of a direction cosine orthogonal to the direction of the magnetic field line is determined according to $\vec{h} \cdot \vec{r}=0$.

In the step 5, the same vector superposition is performed on antennas at different positions as that in the step 3. Multiple planes of electromagnetic wave propagation are determined in the step 4, and an intersection point of the multiple planes is determined as an electromagnetic radiation source.

Although preferred embodiments of the present invention have been described in detail, it will be understood by those skilled in the art that various changes, modifications, replacements, and variations can be made to the embodiments without departing from the principle and spirit of the present invention, the scope of the present invention is defined by the appended claims.

We claim:

1. A method of locating a coal-rock main fracture by an electromagnetic radiation from a precursor of a coal-rock dynamic disaster, comprising of the following steps:

step 1, collecting three-component electromagnetic signals generated by downhole coal-rock fractures, by using at least four groups of non-coplanar three-component electromagnetic sensors arranged in underground tunnels, and ensuring that the non-coplanar three-component electromagnetic sensors in different groups receive the three-component electromagnetic signals synchronously via an atomic clock;

step 2, analyzing frequency spectrums of the three-component electromagnetic signals collected by the at least four groups of non-coplanar three-component electromagnetic sensors, and recognizing and ensuring the three-component electromagnetic signals received by the at least four groups of non-coplanar three-component electromagnetic sensors are from a same main fracture by a signal frequency criterion;

step 3, performing a vector superposition on strengths of the three-component electromagnetic signals received by the at least four groups of non-coplanar three-component electromagnetic sensors to determine a direction of a magnetic field line at each of a plurality of positions where each group of sensors of the at least four groups of non-coplanar three-component electromagnetic sensors is located;

step 4, determining at least one plane of electromagnetic wave propagation according to the direction of the magnetic field line at the position where each group of sensors is located, wherein an electromagnetic wave is perpendicular to the direction of the magnetic field line; and step 5, determining an intersection point of the at least one plane of electromagnetic wave propagation as a location of an electromagnetic radiation source, wherein the at least one plane of electromagnetic wave propagation are determined by the at least four groups of non-coplanar three-component electromagnetic sensors, and the location of the electromagnetic radiation source is an area of the coal-rock main fracture of a precursor of the coal-rock dynamic disaster.

2. The method of claim 1, wherein in the step 1, the at least four groups of non-coplanar three-component electromagnetic sensors are provided with receiving antennas, the receiving antennas are wide-frequency directive antennas with a receiving frequency of 1 Hz-10 kHz, and each two of three antennas in the each group sensors are in an orthogonal arrangement in a form of three-dimensional Cartesian coordinate system.

3. The method of claim 1, wherein in the steps 3, a method of the vector superposition comprises:

① defining three component strengths of the three-component electromagnetic signal as $H_x$, $H_y$, $H_z$, respectively;

② according to a principle of vectorial resultant, calculating a total strength $H=\sqrt{H_x^2+H_y^2+H_z^2}$;

③ calculating azimuth angles $\alpha$, $\beta$, $\gamma$ based on $H_x=H\cos\alpha$, $H_y=H\cos\beta$ and $H_z=H\cos\gamma$, wherein, $\alpha$, $\beta$, $\gamma$ are azimuth angles between the three-component electromagnetic signal and three antennas, respectively; and ④ determining the direction of the magnetic field line according to the azimuth angles and directions of the three antennas, wherein a direction cosine of the magnetic field line is $\vec{h}=(\cos\alpha, \cos\beta, \cos\gamma)$.

4. The method of claim 1, wherein in the step 4, the at least one plane of electromagnetic wave propagation is determined by a formula of a direction cosine orthogonal to the direction of the magnetic field line obtained according to $\vec{h}=(\cos\alpha, \cos\beta, \cos\gamma)$ and $\vec{h}\cdot\vec{r}=0$.

5. The method of claim 1, wherein in the step 5, a number of the at least four groups of non-coplanar three-component electromagnetic sensors is more than 4.

6. The method of claim 1, further comprising step 0, selecting a working surface in the underground tunnels for monitoring, wherein the work surface is monitored by arranging one of the at least four groups of non-coplanar three-component electromagnetic sensors at a working surface track roadway and one of the at least four groups of non-coplanar three-component electromagnetic sensors at a belt conveyance roadway.

7. The method of claim 1, further comprising step 0, selecting a working surface in the underground tunnels for monitoring, wherein the work surface is monitored by arranging one of the at least four groups of non-coplanar three-component electromagnetic sensors at a working surface track roadway and one of the at least four groups of non-coplanar three-component electromagnetic sensors at a belt conveyance roadway, and wherein a distance between the sensor at the working surface track roadway and the sensor at the belt conveyance roadway is 100 m.

8. The method of claim 1, wherein in step 1, the signals are collected by a monitoring host in real time.

* * * * *